US011765084B2

(12) United States Patent
Foxworthy et al.

(10) Patent No.: US 11,765,084 B2
(45) Date of Patent: *Sep. 19, 2023

(54) RETURN-LINK ROUTING IN A HYBRID NETWORK

(71) Applicant: VIASAT, Inc., Carlsbad, CA (US)

(72) Inventors: Michael Foxworthy, Carlsbad, CA (US); Elizabeth F. Connor, Carlsbad, CA (US); Daniel N. Elmore, San Marcos, CA (US); Anil K. Agarwal, North Potom, MD (US); Gregory W. Buhler, San Marcos, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,029

(22) Filed: Dec. 3, 2021

(65) Prior Publication Data

US 2022/0224644 A1 Jul. 14, 2022

Related U.S. Application Data

(63) Continuation of application No. 16/684,290, filed on Nov. 14, 2019, now Pat. No. 11,212,225, which is a
(Continued)

(51) Int. Cl.
*H04L 45/745* (2022.01)
*H04L 45/021* (2022.01)
(Continued)

(52) U.S. Cl.
CPC ............ *H04L 45/745* (2013.01); *H04L 45/00* (2013.01); *H04L 45/021* (2013.01);
(Continued)

(58) Field of Classification Search
CPC ..... H04L 45/745; H04L 45/00; H04L 45/021; H04L 45/245; H04L 61/4511;
(Continued)

(56) References Cited

U.S. PATENT DOCUMENTS

| 6,115,750 A | 9/2000 | Dillon et al. |
| 7,606,559 B2 | 10/2009 | Aarnio et al. |

(Continued)

FOREIGN PATENT DOCUMENTS

| JP | 2007068225 | 3/2007 |
| WO | 0169868 A2 | 9/2001 |
| WO | 2014/112638 | 7/2014 |

OTHER PUBLICATIONS

Baras, et al, "Dynamic Routing in Hybrid Networks with Integrated Voice and Data Traffic," AIP Conference Proceedings, vol. 325, No. 1, May 2008.
(Continued)

*Primary Examiner* — Habte Mered
(74) *Attorney, Agent, or Firm* — HOLZER PATEL DRENNAN

(57) ABSTRACT

Embodiments provide techniques for providing return-link routing in a hybrid communications network that includes a number of different networks having different characteristics. User terminal routing systems (UTRSs) provide interfaces between local user networks and the multiple communications networks of the hybrid network. Each UTRS can include a routing table having stored mappings that are populated according to forward-link communications (implicitly or explicitly), each associating a respective one of a plurality of routing table entries with one of the communications networks. When a UTRS receives return-link data from its respective local user network, the received data indicates a destination node. The UTRS can determine which of the stored mappings corresponds to the destination node and can route the received return-link data over a selected one of the communications networks in accordance with the identified one of the mappings.

29 Claims, 7 Drawing Sheets

Related U.S. Application Data continuation of application No. 15/592,097, filed on May 10, 2017, now Pat. No. 10,511,530.

(60) Provisional application No. 62/433,689, filed on Dec. 13, 2016.

(51) Int. Cl.
*H04L 45/24* (2022.01)
*H04L 45/00* (2022.01)
*H04L 61/4511* (2022.01)
*H04L 61/5007* (2022.01)
*H04L 61/2514* (2022.01)

(52) U.S. Cl.
CPC ........ *H04L 45/245* (2013.01); *H04L 61/4511* (2022.05); *H04L 61/5007* (2022.05); *H04L 61/2514* (2013.01)

(58) Field of Classification Search
CPC . H04L 61/5007; H04L 61/2514; H04L 45/54; Y02D 30/50
See application file for complete search history.

(56) References Cited

U.S. PATENT DOCUMENTS

| | | |
|---|---|---|
| 8,005,497 B2 | 8/2011 | Shaffer et al. |
| 8,498,295 B1 | 7/2013 | Saxena |
| 8,611,349 B1 | 12/2013 | Judge |
| 8,792,876 B1 | 7/2014 | Zhu |
| 8,804,730 B2 | 8/2014 | Foxworthy et al. |
| 8,971,245 B2 | 3/2015 | Haynes et al. |
| 9,048,995 B2 | 6/2015 | Xia et al. |
| 9,374,294 B1 | 6/2016 | Pani |
| 2002/0013844 A1 | 1/2002 | Garrett |
| 2004/0213272 A1 | 10/2004 | Nishi |
| 2004/0215758 A1 | 10/2004 | Kompella |
| 2006/0083254 A1 | 4/2006 | Ge |
| 2010/0189107 A1 | 7/2010 | Corson |
| 2010/0284403 A1* | 11/2010 | Scudder .................. H04L 45/04 370/392 |
| 2012/0002673 A1 | 1/2012 | Mohapatra |
| 2014/0003359 A1 | 1/2014 | Williams |
| 2014/0029447 A1* | 1/2014 | Schrum, Jr. ............. H04L 1/203 370/252 |
| 2014/0092901 A1* | 4/2014 | Kapadia ............. H04L 49/3009 370/392 |
| 2015/0020137 A1 | 7/2015 | Fu et al. |
| 2016/0020922 A1 | 1/2016 | Sung |
| 2016/0037434 A1* | 2/2016 | Gopal .................. H04B 7/1851 370/316 |
| 2016/0094467 A1 | 3/2016 | Hong et al. |
| 2016/0164734 A1 | 6/2016 | Durgin et al. |
| 2016/0278140 A1 | 9/2016 | Sung |
| 2017/0294957 A1* | 10/2017 | Ravishankar ......... H04W 40/12 |
| 2018/0092020 A1 | 3/2018 | Torres |
| 2018/0098247 A1 | 4/2018 | Gopal |

OTHER PUBLICATIONS

Perez-Trufero, et al. "Next Generation HTS System Using Hybrid Satellit4e and Terrrestrial BB Delivery-BATS," Loughborough University, 21st KA Band Conference, Bologna, Italy, Oct. 12-14, 2015.

* cited by examiner

RETURN-LINK ROUTING IN A HYBRID NETWORK

RELATED APPLICATIONS

This application is a continuation of U.S. application Ser. No. 16/684,290 filed on Nov. 14, 2019, entitled "RETURN-LINK ROUTING IN A HYBRID NETWORK", which is a Continuation of U.S. patent application Ser. No. 15/592,097 filed on May 10, 2017 entitled "RETURN-LINK ROUTING IN A HYBRID NETWORK", which claims the benefit of U.S. Pat. Prov. App. No. 62/433,689 filed on Dec. 13, 2016, the entirety of which is incorporated herein by reference.

FIELD

Embodiments relate generally to communications systems, and, more particularly, to routing of return-link traffic in a hybrid communications network.

BACKGROUND

Many communications networks have large numbers of user that interface with the networks via large numbers of user terminals. It can be desirable in such networks for the user terminals to be implemented at relatively low cost and with relatively low complexity. Some modern communications environments include hybrid networks, in which the user terminals are in communication with multiple different types of networks having different characteristics. For example, the hybrid network can include one or more higher-throughput, higher-latency networks (e.g., a satellite network) and one or more lower-throughput, lower-latency networks (e.g., a cable network, a cellular network, etc.). Routing different traffic flows over the different networks can more efficiently utilize the overall resources of the hybrid network. However, determining which of the networks to use for each traffic flow (e.g., in real time) can be computationally intensive. While provider-side nodes of the network (e.g., gateways, core nodes, etc.) can include sufficient processing capability to make such determinations for forward-link traffic, the user terminals may not have sufficient processing capability to make such determinations for return-link traffic.

BRIEF SUMMARY

Among other things, systems and methods are described for providing return-link routing in a hybrid communications network. The hybrid communications network includes a number of different networks having different characteristics (e.g., different latencies, different throughput, different user cost per bit, etc.). Users can interface with the hybrid network via respective user terminals that include user terminal routing systems. For example, each user terminal routing system provides an interface between a local user network (e.g., providing local communications with one or more consumer premises equipment (CPE) devices) and the multiple communications networks of the hybrid network. Each user terminal routing system can include a routing table having stored thereon multiple mappings. The mappings are populated according to forward-link communications received via at least one of the networks, and each mapping associates a respective one of a plurality of routing table entries with one of the communications networks. Each routing table entry identifies at least a forward-link content source (FLCS) identifier, for example, as part of a routing tuple, or the like. When a user terminal routing system receives return-link data from its respective local user network, the received return-link data indicates a destination node. The user terminal routing system can determine which of the stored mappings has a FLCS identifier that corresponds to (e.g., matches) the destination node, and the user terminal routing system can route the received return-link data over a selected one of the communications networks in accordance with the identified one of the mappings.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
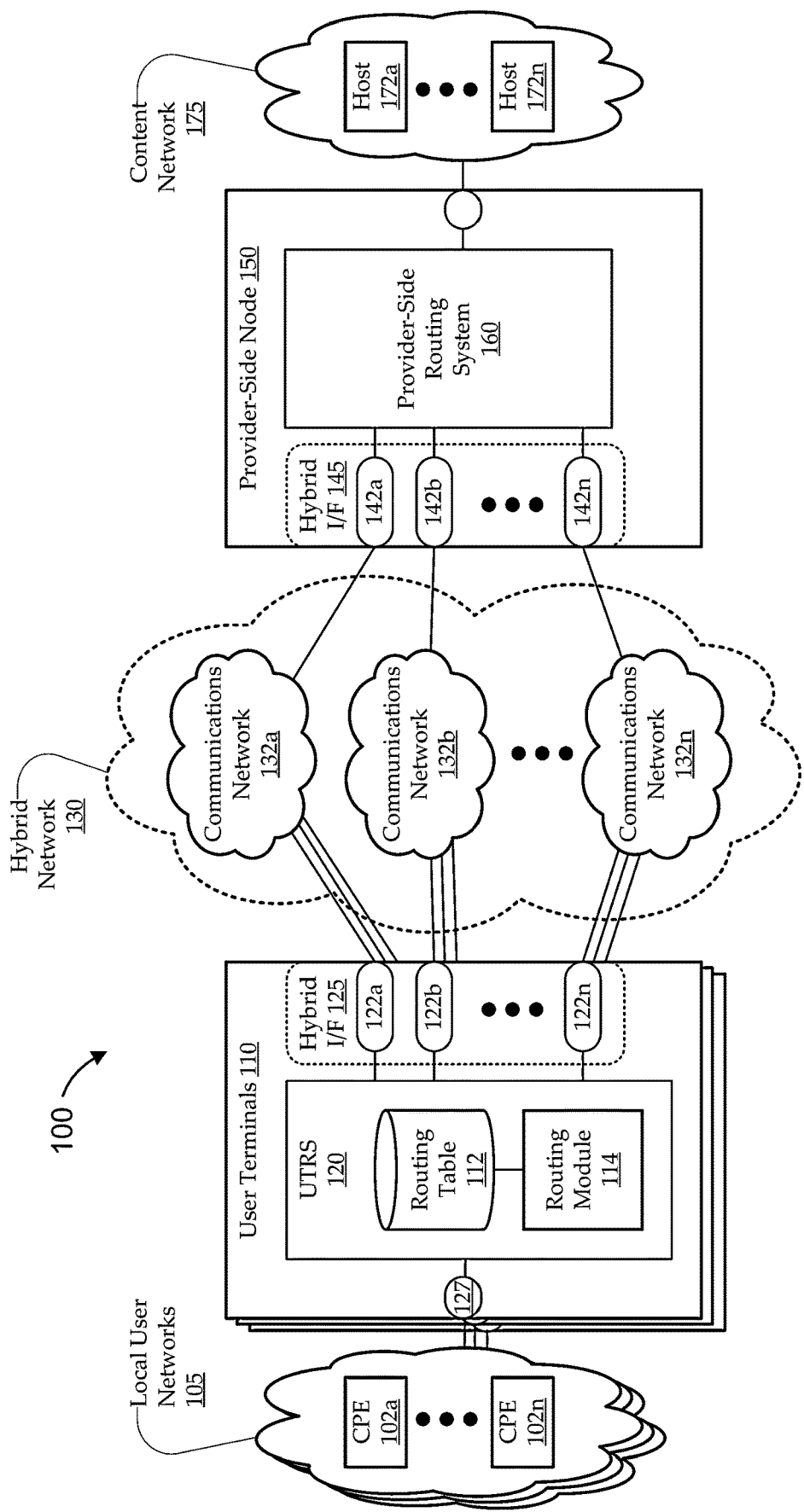
FIG. 1 shows an illustrative hybrid communications environment, as a context for various embodiments.

FIG. 1 shows an illustrative hybrid communications environment 100, as a context for various embodiments. As illustrated, the hybrid communications environment 100 includes a number of user terminals 110 in communications with at least one provider-side network node 150 via a hybrid communications network 130. The hybrid communications network 130 includes a number of communications networks 132 that provide different network characteristics. The communications networks 132 can include any suitable types of networks for carrying different types of traffic and can include wired, wireless, public, private, secure, unsecure, and/or other network links. For example, one of the communications networks 132 can provide relatively high throughput with relatively high latency and a relatively high cost per bit. For example, the communications network 132 can include a satellite link having a geosynchronous earth orbit (GEO) satellite, a medium earth orbit (MEO) satellite, a low earth orbit satellite (LEO), etc.

Another of the communications networks 132 can provide relatively low throughput with relatively low latency and a relatively low cost per bit. For example, the communications network 132 can include a terrestrial network, such as a digital subscriber line (DSL) network, a cable based network, a long-term evolution (LTE) wireless network, a cellular network, or the like. Alternatively, one communications network 132 can be a GEO satellite network, and another communications network 132 cam be a MEO or LEO satellite network. In some cases, multiple of the communications networks 132 of the hybrid communications network 130 can have similar or identical network characteristics.

The hybrid communications network 130 can provide communications between local user networks 105 and content networks 175 via the user terminals 110, the communications networks 132, and the provider-side network node(s) 150. Each local user network 105 can include one or more consumer premises equipment devices (CPEs) 102 that are coupled with their respective user terminal 110 via wired or wireless connections. For example, the user terminals 110 can include any suitable local network interface 127, such as a wired and/or wireless router that implements a local area network. The CPEs 102 can be home or office computing devices, such as desktop computers, laptop computers, smart phones, tablet devices, Internet-enabled televisions or other appliances, or the like. The content network(s) 175 can include any suitable remote network, such as the Internet. As illustrated, the content network(s) 175 can include any suitable number of host computers 172, such as content servers. The host computers 172 can host (or otherwise provide) any suitable type of content, such as audio and/or video file access, audio and/or video streaming service, voice over Internet protocol (VoIP) service, online gaming content, messaging (e.g., including control messages for the hybrid communications network 130), etc. For example, users can subscribe to communications services and/or content services (e.g., Internet service), which they can access over the hybrid communications network 130 via their CPEs 102.

In some embodiments, the user terminal 110 can include a hybrid network interface 125 for receiving forward-link data from, and transmitting return-link data to, the multiple communications networks 132 of the hybrid communications network 130. For example, as described below, the user terminal 110 can include physical and/or logical ports 122, layer 3 routing modules, forwarding modules (e.g., for forwarding through layer 2 tunnels), and/or any other suitable components. The provider-side network node 150 can include a provider-side hybrid network interface 145, including similar or different components for interfacing with the communications networks 132 of the hybrid communications network 130. For example, the provider-side hybrid network interface 145 can include physical and/or logical ports 142, layer 3 routing modules, forwarding modules, etc. The provider-side network node 150 can also include a provider-side routing module 160 that makes routing determinations (e.g., forward-link routing determinations) for routing and/or forwarding traffic over the hybrid communications network 130. The can include data classifiers, and/or any other suitable components for making routing determinations. For example, a data classifier in the provider-side network node 150 classifies forward-link data destined for a CPE 102 and determines over which communications network 132 to forward the forward-link data in accordance with the classification. Embodiments of the provider-side network node 150 can include any other suitable components, such as edge servers, traffic shapers, network accelerators, data classifiers, and/or any other suitable components. Though only one provider-side network node 150 is shown as coupled with all the communications networks 132, other embodiments are implemented with other architectures. For example, some or all of the communications networks 132 can terminate at respective provider sides in respective provider-side network nodes 150 (e.g., gateways, head-ends, mobile switching centers, etc.), and those provider-side network nodes 150 can be in communication with another provider-side network node 150 (e.g., a core node, or the like) that performs forward-link routing functionality described herein.

Routing traffic through a hybrid communications network 130 involves determining, for each suitable unit of traffic (e.g., each traffic flow, each established logical connection, each deterministically sized chunk of data, each packet, etc.), over which of the communications networks 132 to route the traffic. In the forward-link direction, traffic typically originates at one of the content hosts 172 and is destined for one of the CPEs 102. The traffic can be intercepted by the provider-side network node 150, and the provider-side network node 150 can determine an appropriate routing or forwarding decision, for example, by classifying the content of the traffic. As an example, in a particular household, one member of the household is streaming a movie while another is surfing the internet. The provider-side network node 150 may determine to deliver the streaming movie over a first of the communications networks 132a that is a satellite network (e.g., because the higher throughput will yield a high-quality stream of the movie, and the higher latency will not have an appreciable impact on the viewing experience) and to deliver the Internet surfing traffic over a second of the communications networks 132b that is a DSL network (e.g., because reduced latency will likely benefit the surfing experience, while the reduction in throughput will likely not have an appreciable impact on the surfing experience).

The data classification and other aspects of the routing determinations can be highly computationally intensive. For example, the classifying can involve deep packet inspection, statistical processing, etc. Still, typical provider-side network nodes 150 can be implemented with sufficient computational resources to perform such determinations for forward-link traffic, even substantially in real time and for large numbers of traffic flows. However, it is typically desirable for the user terminals 110 to be implemented at relatively low cost and with relatively low complexity. For example, while the provider-side network node 150 can be implemented in a large and expensive computational environment, it is typically desirable for each user terminal 110 to be implemented as a small, inexpensive, reliable, simple device that can be installed in each user's premises. Accordingly, user terminals 110 typically may not have sufficient processing capability to make such determinations for return-link traffic.

Accordingly, embodiments described herein include novel systems and methods for providing return-link routing in a user terminal 110 in communication with a hybrid communications network 130. As illustrated, each user terminal 110 includes a user terminal routing system (UTRS) 120 coupled between the hybrid network interface 125 and the local network interface 127. The UTRS 120 includes a routing module 114 and a routing table 112. As described herein, rather than making computationally intensive routing determinations, the routing module 114 can make routing determinations according to mappings populated and dynamically updated in the routing table 112 according to received forward-link communications. For example, each mapping associates a routing table entry with one of the communications networks 132, such that, when return-link traffic is received by the routing module 114 (from a CPE 102), the routing module 114 can find a mapping in the routing table 112 that has a corresponding routing table entry and can route the return-link traffic, accordingly. Each routing table entry can be uniquely identified at least according to a forward-link content source (FLCS) identifier. For example, the FLCS identifier can be an Internet protocol (IP) address that was the source IP address of previously received forward-link traffic and may be the destination IP address of subsequent return-link traffic. As described herein, the FLCS identifier can be obtained or derived from a routing tuple (e.g., a 2-tuple, a 5-tuple, etc.), a control message, a domain name server (DNS) lookup or reverse lookup, or in any other suitable manner. The routing table 112 can be implemented as a lookup table, or the like, which can be queried very quickly and with very low computational intensity.

Figure 2A:
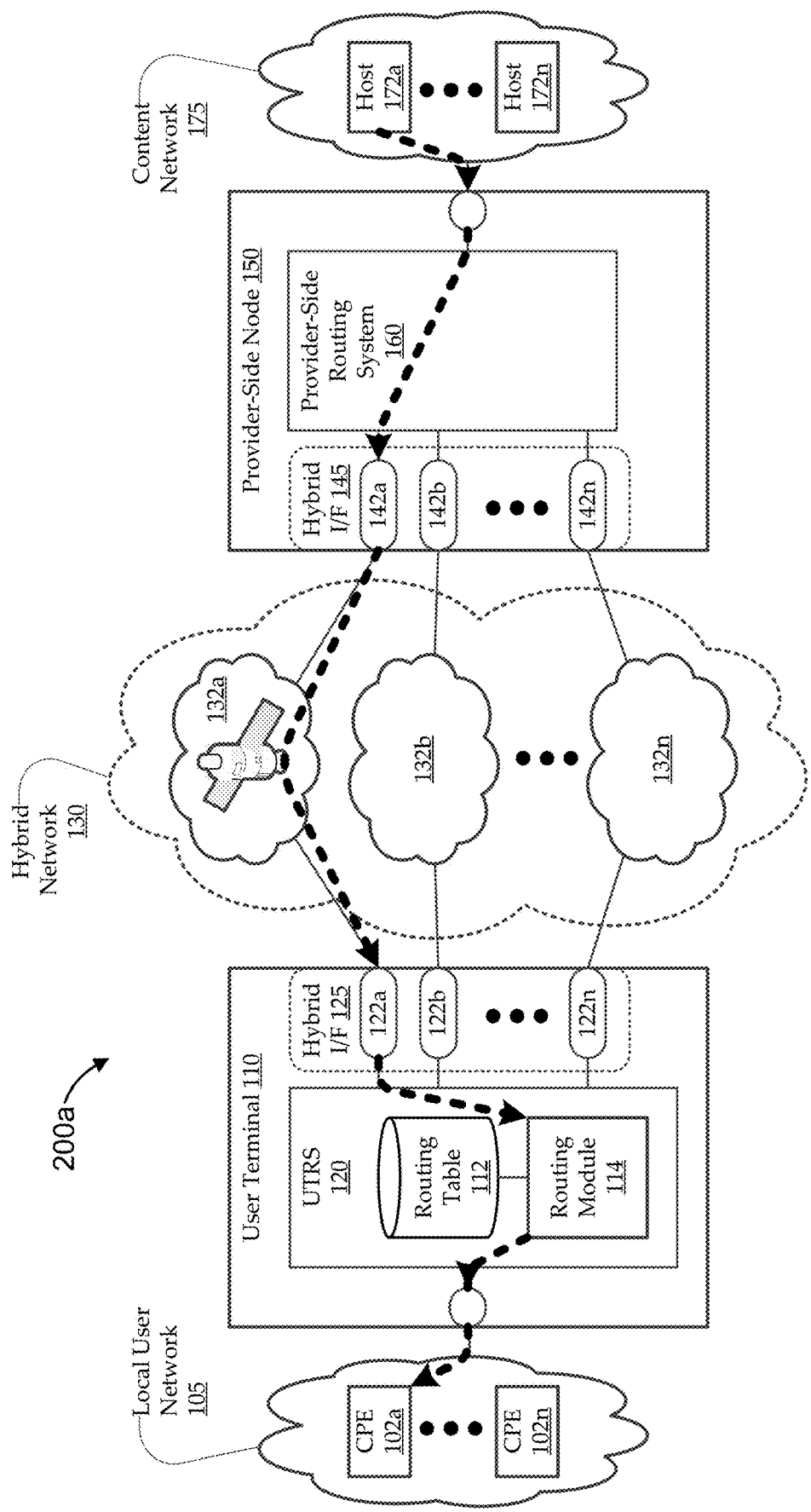
FIGS. 2A-2C show a first set of examples in which return-link routing determinations are made by a user terminal in a hybrid communications environment.
Figure 2B:
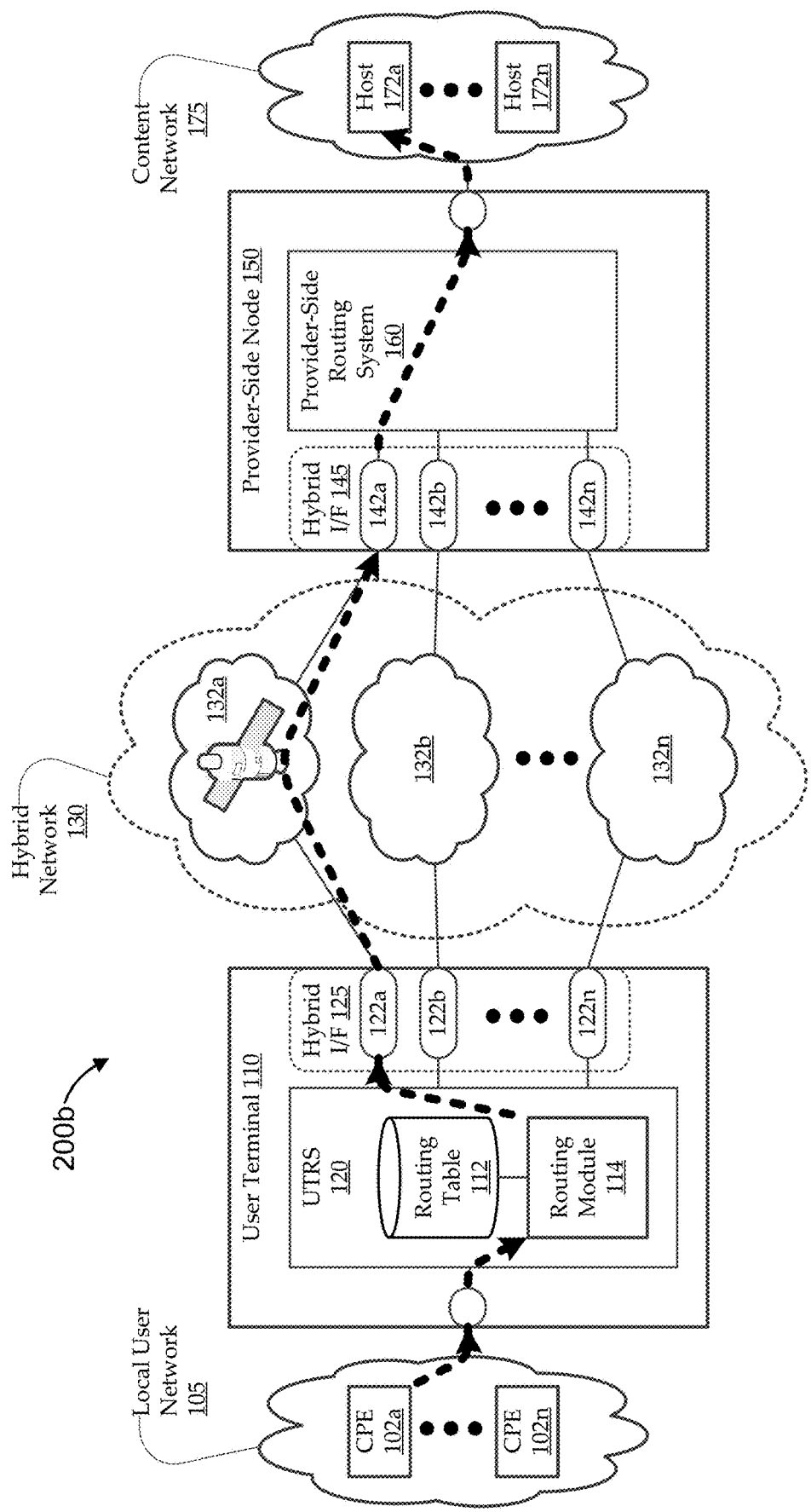
Figure 2C:
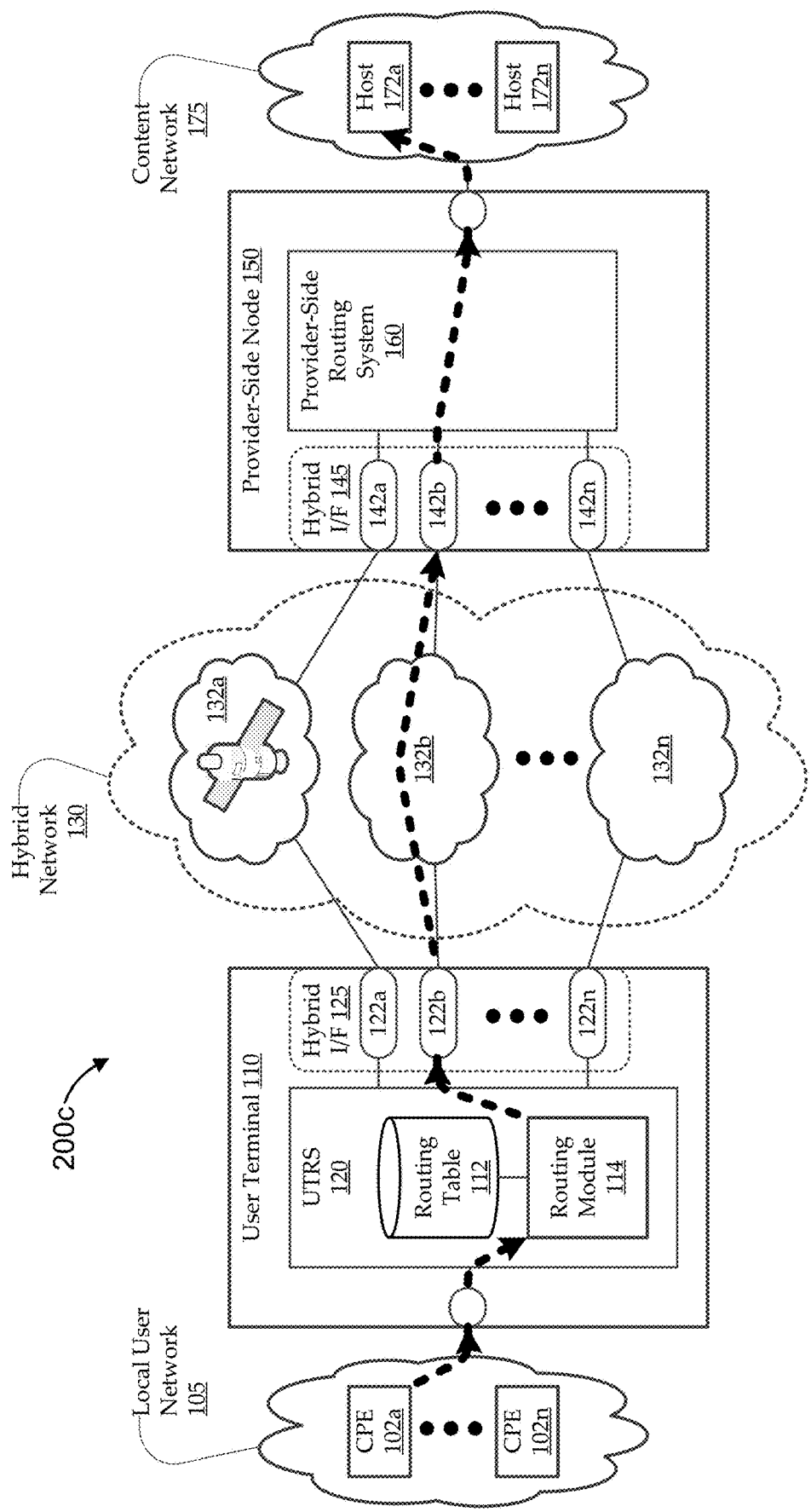

FIGS. 2A-2C show a first set of examples in which return-link routing determinations are made by a user terminal 110 in a hybrid communications environment 200. In the illustrated set of examples, return-link routing determinations are made in accordance with receipt of forward-link communications. Turning first to FIG. 2A, a thick dashed arrow indicates a forward-link traffic flow path originating at one of the host computers 172 in the content networks 175 and terminating in one of the CPEs 102 of a local user network 105 associated with a user terminal 110. The flow is received (e.g., intercepted) by a provider-side network node 150. A provider-side routing module 160 in the provider-side network node 150 can classify the traffic and/or make any determinations to support a decision as to over which of the communications networks 132 to route the traffic. The traffic can be output to the hybrid communications network 130 via an appropriate interface (e.g., port 142) of the provider-side hybrid network interface 145. In the illustrated case, the determination is to route the traffic to a first communications network 132a via a first interface port 142a (e.g., and a level 3 router, not shown), where the first communications network 132a is a satellite network.

The traffic is received from the first communications network 132a via a first interface port 122 of the hybrid network interface 125 of the user terminal 110 and is passed to the routing module 114 of the UTRS 120. The forward-link traffic can be passed from the UTRS 120 to the appropriate destination CPE 102 via the local network interface 127. Additionally, as described more fully below, the routing module 114 can update (and/or determine whether to update) the routing table 112 mappings based on the received traffic. In the illustrated case, the routing module 114 can generate or update a mapping in the routing table 112 based on the source IP address of the traffic and the network over which the traffic was received (i.e., the first communications network 132a). In some implementations, the forward-link traffic packets include a tuple that includes at least a source IP address. For example, the tuple can be a 2-tuple that indicates a source IP address and a source port; or the tuple can be a 5-tuple that indicates a source IP address, a source port, a destination IP address, a destination port, and a communications protocol. The routing module 114 can store at least the source IP address as a FLCS identifier of a routing table entry. The FLCS identifier can be the routing table entry, or the routing table entry can include the FLCS and additional information. For example, some implementations can invert the received 5-tuple, store the inverted 5-tuple as the routing table entry (i.e., so that the source port and IP address of the 5-tuple is stored as the destination port and IP address) in the routing table entry), and map the routing table entry to the receiving communications network 132. The additional information can be used in certain embodiments. For example, some embodiments can have different return-link mappings for traffic from different CPEs 102, having different communications protocols, etc., even when destined for a same content host 172.

Turning to FIG. 2B, subsequent to updating the routing table 112 according to the received forward-link traffic in FIG. 2A, return-link traffic is received by the UTRS 120 from a CPE 102 of the local user network 105. When the return-link traffic is received, the routing module 114 can determine (e.g., parse) a destination identifier for the return-link traffic and can identify one of the mappings in the routing table 112 that corresponds with the destination identifier. For example, the return-link traffic can indicate a destination IP address that matches the FLCS identifier of one of the routing table entries. The identified mapping in the routing table 112 maps the FLCS identifier to one of the communications networks 132. In the illustrated case, the return-link traffic is destined for the same host computer 172 from which the forward-link traffic was received over the satellite network (first communications network 132a) in FIG. 2A. The mapping updated in FIG. 2A associates the FLCS identifier for that host computer 172 with the first communications network 132a. Accordingly, as illustrated, the UTRS 120 can determine (according to the routing table 112) to route the received return-link traffic to the destination host 172a over the first communications network 132a (e.g., via interface port 142a and the provider-side routing module 160).

In some cases, traffic associated with a particular host computer 172 can be routed differently in the forward-link and return-link directions. FIG. 2C illustrates such a case, in which return-link traffic, though destined for the first host computer 172a (previously mapped to the first communications network 172a in the routing table 112 in FIG. 2A), is routed through a second communications network 172b of the hybrid communications network 130. Such a case can arise in a number of different contexts. In one such context, the each routing table of the routing table 112 is uniquely identified by more than just the destination identifier. For example, the routing table 112 can include multiple routing table entries having the same destination identifier, but having different other parameters (e.g., different protocols, etc.). As an example of such a context, the forward-link traffic received from the host computer 172a in FIG. 2A is part of a traffic flow for a streaming movie, while the return-link traffic sent in FIG. 2C is a playback navigation message (e.g., 'pause') being sent from the CPE 102a back to the host computer 172a. In another such context, the routing module 114 and/or routing table 112 includes certain routing directives that route certain traffic according to certain rules, regardless of whether there is a conflicting mapping in the routing table 112. For example, the routing module 114 can include a rule (or the routing table 112 can have a hierarchically dominant mapping) that always routes return-link traffic from a particular CPE 102 (e.g., from a particular private return-link source IP address) over the second communications network 132b. In yet another such context, other network considerations can take precedence over the routing table 112. For example, detected network congestion on the first communications network 132a can trigger diversion of traffic (e.g., of large file uploads) from the first communications network 132a to the second communications network 132b, regardless of any mappings to the contrary. In still another context, mappings in the routing module 114 can have associated validity windows, or other types of hysteresis, or the like. For example, some or all mappings may be changed only after a predetermined threshold number of change events occurs (e.g., only after three traffic flows in a row are received from a particular host computer 172 over the same one of the communications network 132), or some or all mappings may only be valid over a particular window (e.g., the mapping(s) automatically reset to a default mapping after some duration of time has elapsed since a last event confirming the mapping, after a particular logical connection session ends, etc.).

Figure 3:
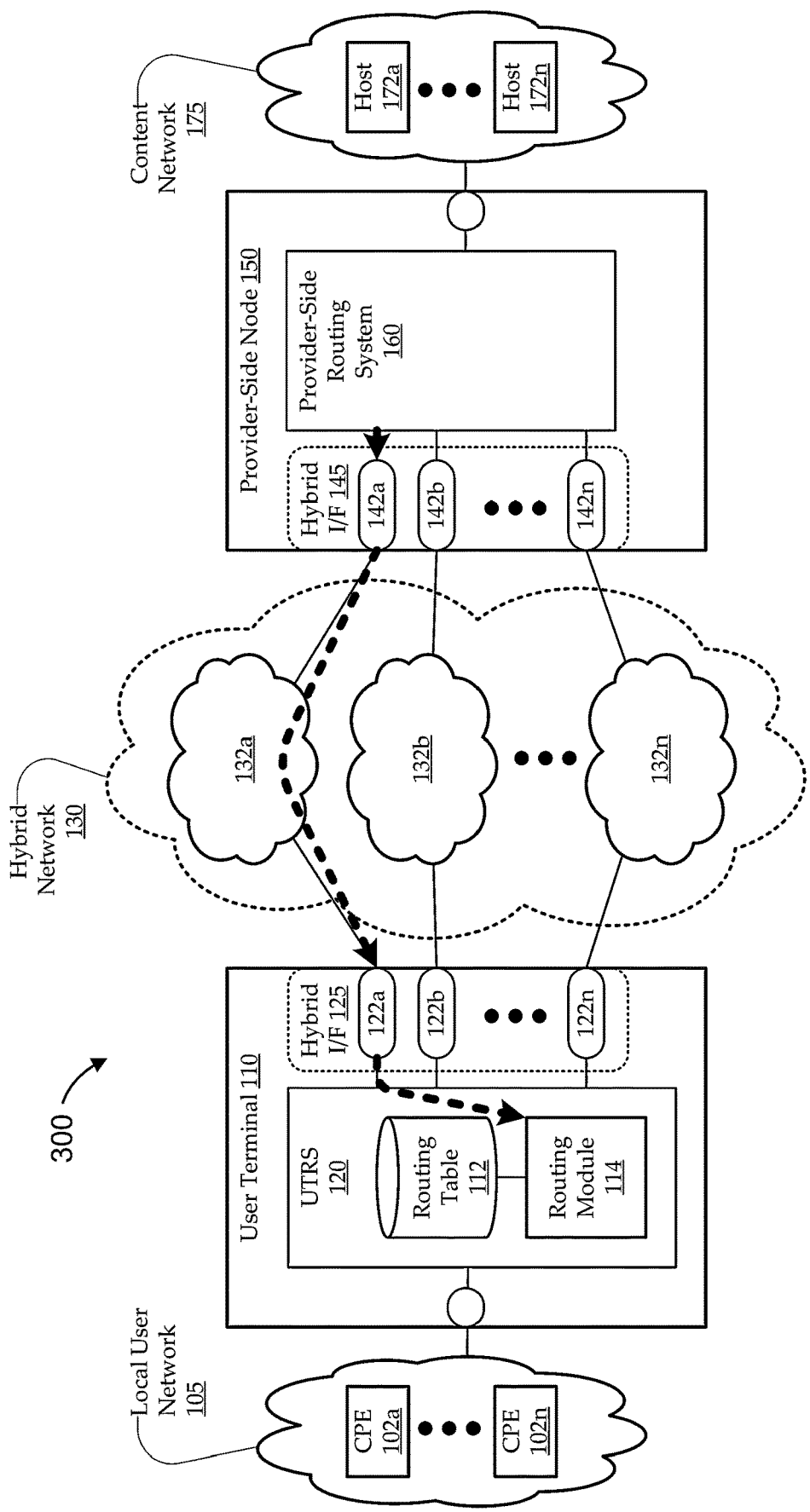
FIG. 3 shows a second example in which return-link routing determinations are made by a user terminal in a hybrid communications environment.

FIG. 3 shows a second example in which return-link routing determinations are made by a user terminal 110 in a hybrid communications environment 300. In the illustrated example, return-link routing determinations are made in accordance with receipt of control messages via forward-link communications. A thick dashed arrow indicates a forward-link control message flow path originating at the provider-side routing module 160 of the provider-side network node 150. The control messages are output to the hybrid communications network 130 via an appropriate interface (e.g., port 142) of the provider-side hybrid network interface 145. While the illustrated case shows the control message being routed over one particular communications network 132, other implementations can send the control messages over any one or more of the communications networks 132. The control messages are received from the hybrid communications network 130 (e.g., from the first communications network 132a) via the hybrid network interface 125 of the user terminal 110 (e.g., via the first interface port 122a) and is passed to the routing module 114 of the UTRS 120. In this case, the control messages are not passed to a CPE 102, as they are tailored to be used directly by the UTRS 120 to generate and/or update mappings. The routing module 114 can obtain (e.g., parse, derive, etc.) routing table updates from the received control messages and can update the routing table 112, accordingly. For example, the control messages can include a list of routing table entries (e.g., FLCS identifiers, 5-tuples, etc.) and associated communications networks 132, from which mappings can be generated. Some embodiments use a combination of techniques to populate and/or dynamically update the routing table 112, for example, using both control messages as in FIG. 3 and forward-link traffic data as in FIG. 2A.

Figure 4:
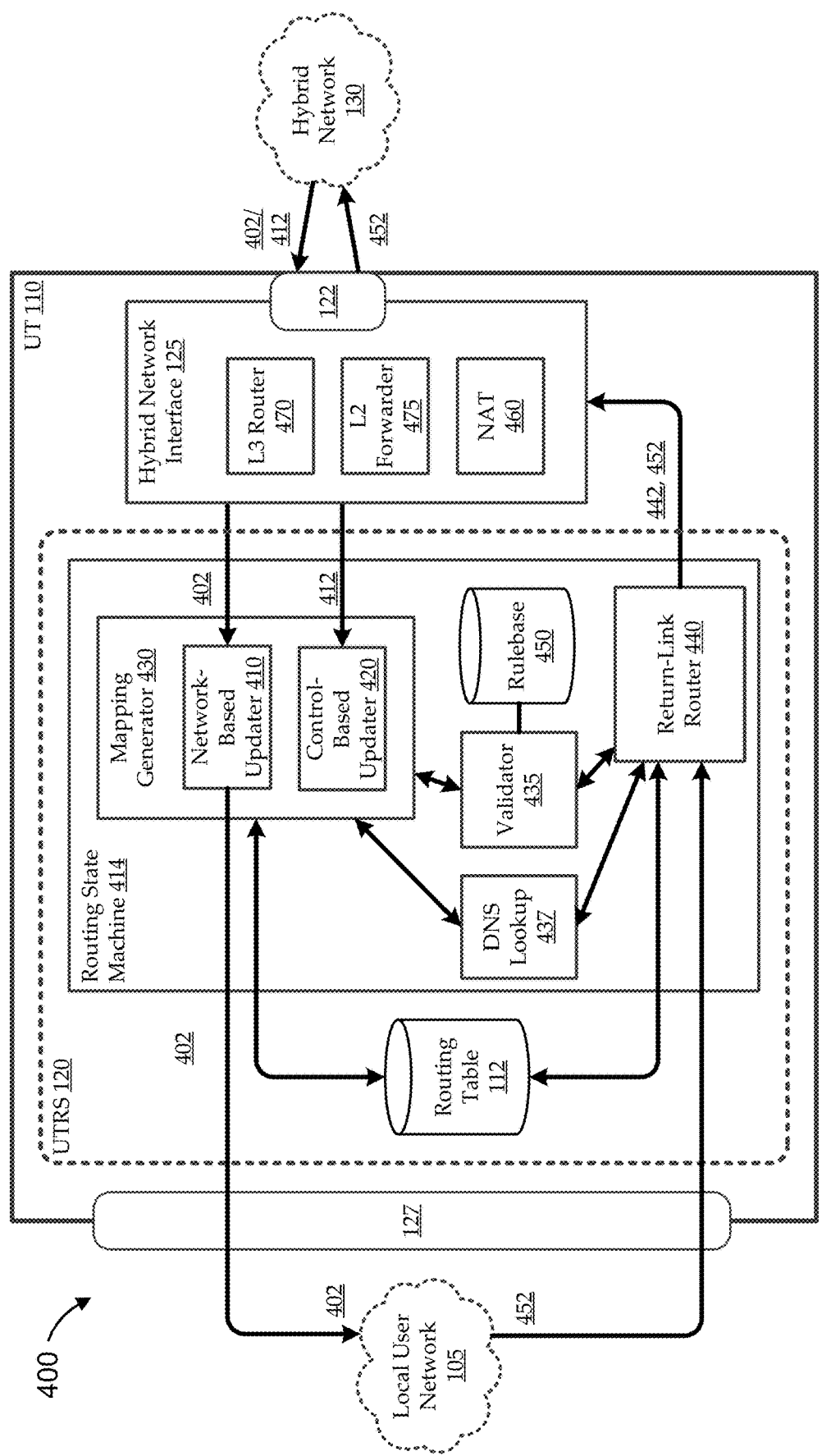
FIG. 4 shows a block diagram of a user terminal environment, including an illustrative user terminal in communication with a local user network and a hybrid communications network, according to various embodiments.

FIG. 4 shows a block diagram of a user terminal environment 400, including an illustrative user terminal 110 in communication with a local user network 105 and a hybrid communications network 130, according to various embodiments. As illustrated, forward-link traffic 402 is received from the hybrid communications network 130 and directed to an appropriate CPE in the local user network 105, and return-link traffic 452 is received from a CPE of the local user network 105 and routed (e.g., forwarded, routed, etc.) to an appropriate communications network of the hybrid communications network 130. The user terminal 110 can include a hybrid network interface 125 and a user terminal routing system (UTRS) 120, having a routing table 112 and a routing module implemented as a routing state machine 414. In some embodiments, the routing table 112 is implemented as a lookup table. In other implementations, the routing table 112 is implemented as any suitable type of fast-access data store.

Embodiments of the hybrid network interface 125 can include physical and/or logical network interfaces (e.g., ports 122) that can be adapted to the particular component networks of the hybrid communications network 130. The hybrid network interface 125 can also include a router 470 for layer 3 routing (e.g., over a primary one of the component networks, such as a satellite network) and a forwarder 475 for layer 2 forwarding (e.g., implementing a layer 2 tunnel endpoint). Some embodiments of the hybrid network interface 125 can include additional network interface components, such as a network address translator (NAT) 460. For example, the NAT 460 can translate between private IP addresses of the CPEs of the local user network 105 and a public address of the user terminal 110 as seen by the hybrid communications network 130.

As illustrated, embodiments of the UTRS 120 include (e.g., are coupled with, have integrated within, etc.) a local network interface 127 operable to couple with a local user network 105. The UTRS 120 also includes a hybrid network interface 125 that has multiple network interfaces 122, each operable to couple with a respective one of the multiple communications networks 132 of the hybrid communications network 130. The UTRS 120 also includes a routing table 112 having stored thereon multiple mappings populated according to forward-link communications (e.g., 402, 412) received via at least one of the communications networks 132. Each mapping associates a respective one of a number of routing table entries with one of the communications networks 132, and each routing table entry identifies at least a forward-link content source (FLCS) identifier (e.g., a host computer IP address).

The UTRS 120 also includes a routing module 114, which can be implemented as a routing state machine 414, as shown. The routing state machine 414 can be implemented in any suitable manner. In some implementations, the routing state machine 414 is a hardware state machine that performs various functions using circuits, such as programmable circuits, processors, etc. In other implementations, some functions are implemented in hardware, software, firmware, or any combination thereof. If implemented in software, the functions can be stored as one or more instructions on a non-transitory computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer.

Embodiments of the routing state machine 414 are coupled between the local network interface 127 and the hybrid network interface 125, and the routing state machine 414 includes a routing state output 442 computed according to the routing table 112 in response to receiving return-link data 452 via the local network interface 127. The received return-link data 452 indicates a destination node corresponding to the FLCS identifier of an identified one of the mappings, and the routing state output 442 directs routing of the received return-link data 452 over a selected one of the communications networks 132 via the hybrid network interface 125 in accordance with the identified one of the mappings.

Some embodiments of the UTRS 120 include some or all of a mapping generator 430 and a return-link router 440. In some embodiments, the routing table 112 is updated according to received forward-link traffic 402. As described herein, embodiments can populate and/or update routing table 112 mappings in various ways, including according to received forward-link traffic flows 402 and/or control messages 412. For added clarity, FIG. 4 shows both types of forward-link communications being received by the user terminal 110 (and by the UTRS 120). Further, the mapping generator 430 is illustrated as having both a network-based updater 410 and a control-based updater 420 for updating mappings in response to forward-link traffic 402 and control messages 412, respectively. Some implementations of the mapping generator 430 include only one of the network-based updater 410 or the control-based updater 420.

In some embodiments, the forward-link traffic 402 is received by the hybrid network interface 125 from one of the communications networks 132 and passed to the network-based updater 410 of the mapping generator 430. The network-based updater 410 can obtain (e.g., parse, derive, etc.) a routing profile for the received forward-link traffic 402 that includes at least a FLCS identifier (e.g., as the source IP address). In some cases, the routing profile can include an identifier of the communications network 132 over which the forward-link traffic 402 was received, the source port, the destination IP address, the destination port, the routing protocol, and/or other characteristics of the forward-link traffic 402. The network-based updater 410 can use the obtained routing profile to generate (e.g., create, update, etc.) a mapping in the routing table 112. For example, the FLCS identifier can be stored as a routing table entry in mapped association with the communications network 132 over which the traffic was received, or a 5-tuple of the received forward-link traffic 402 can be inverted and stored as the routing table entry and mapped to an appropriate one of the communications networks 132. The updated mapping can be populated by the mapping generator 430 to the routing table 112.

Similarly, control messages 412 can be received as forward-link communications by the hybrid network interface 125 from one or more of the communications networks 132. The control messages 412 can be passed to the control-based updater 420 of the mapping generator 430, and the control-based updater 420 can obtain (e.g., parse, derive, etc.) one or more mapping updates therefrom. For example, the control messages 412 can indicate a list of mappings between each of a number of FLCS identifiers (and/or other routing profile information) and respective ones of the communications networks 132 over which to route (e.g., route, forward, etc.) return-link data destined for a host computer corresponding to the FLCS. The updated mappings can be populated by the mapping generator 430 to the routing table 112.

In some embodiments, the routing table 112 is at least partially pre-populated and/or automatically populated with information not arising from forward-link communications. In such cases, the routing table 112 is still dynamically updated and/or further populated from forward-link communications (e.g., from forward-link traffic 402 and/or control messages 412). In some such embodiments, the routing table 112 is preloaded with default mappings (e.g., prior to deployment to a customer premises, as part of initializing the device at the customer's premises, etc.). Some such embodiments include a domain name server (DNS) lookup module 437. For example, the routing table 112 can be pre-populated with default mappings between host names (e.g., content domains) and particular ones of the communications networks 132 over which to route return-link traffic to those hosts. With the UT 110 (e.g., and the UTRS 120) coupled to the hybrid communications network 130, the DNS lookup module 437 can perform DNS lookups to resolve the mapped host names into IP addresses for use as FLCS identifiers in routing table entries. In some implementations, the DNS lookup module 437 can periodically (e.g., according to a schedule, whenever communications indicate that host name, and/or at any other suitable time) re-resolve some or all of the host names to ensure that the associations remain fresh. Alternatively, the resolved host IP addresses are only used for the default mappings, and some or all of those mappings are dynamically updated in accordance with received forward-link communications, as described herein. In some implementations, associations between the host names and the resolved host IP addresses can be stored for further use, for example, as described below. For example, a control message 412 can indicate a particular mapping update for all IP addresses associated with a particular group of related hosts (e.g., where one content host uses multiple IP addresses as mirror sites, as content distribution networks (CDNs), etc.; where a particular group of host names is associated with a same class of traffic (e.g., video streaming); etc.); and the stored associations can be used to quickly update the mappings for multiple routing table entries in accordance with their association with the indicated hosts.

Some embodiments of the mapping generator 430 include, or are in communication with, a validator 435 that is coupled with a stored rulebase 450. Embodiments of the validator 435 can determine whether and when to permit the mapping generator 430 to update mappings in the routing table 112 according to rules in the rulebase 450. In some embodiments, some or all of the rules in the rulebase 450 are hard-coded prior to deployment of the user terminal 110. In other embodiments, some or all of the rules of the rulebase 450 are hardware or software programmable according to control messages 412 received via the hybrid network interface 125, by local user commands received via the local network interface 127, and/or in any other suitable manner. In some implementations, the rulebase 450 defines a validity window for some or all mappings in the routing table 112. For example, a particular mapping cannot be updated more than some number of times within a particular timeframe (e.g., more than once per hour), cannot be updated within a certain amount of time since its last update, etc. In other implementations, the rulebase 450 defines an update threshold for some or all of the mappings. For example, a particular mapping may only be updated after a certain number of flows from a particular host is received over a same network that is different from what is currently mapped. In other implementations, the rulebase 450 defines other types of update conditions. For example, some hybrid communications networks 130 can be defined to have a hierarchy (e.g., a primary one of the communications networks 132, where all the other communications networks 132 are secondary networks; each of the communications networks 132 is in a priority order; etc.). In such a case, particular rules can take effect when a mapping is being changed from a primary network to a secondary network, from a secondary network to a primary network, etc. For example, the rulebase 450 can be designed so that it is easier to update mappings from primary networks to secondary networks than from secondary networks to primary networks (e.g., tending toward offloading traffic from the primary network).

As illustrated, in addition to using the received forward-link traffic 402 for updating mappings, the forward-link traffic 402 can be forwarded to the appropriate destination CPE in the local user network 105. Though shown as being forwarded from the network-based updater 410, the forward-link traffic 402 can be forwarded in any suitable manner, for example, directly from the hybrid network interface 125. The CPE(s) of the local user network 105 can also originate return-link traffic flows 452 destined for some destination host over the hybrid communications network 130. The return-link traffic flows 452 are received by the return-link router 440 of the UT 110 via the local network interface 127, so that the return-link router 440 can determine over which of the communications networks 132 to route the return-link traffic flows 452. As described herein, embodiments can rapidly make such determinations with little computational intensity by relying on the mappings stored in the routing table 112. For example, the return-link router 440 obtains (e.g., parses, derives, etc.) a destination identifier (e.g., a destination IP address) from the return-link traffic flow 452 and identifies a routing table entry in the routing table 112 that corresponds to (e.g., matches) the obtained destination identifier. For example, the return-link router 440 performs a lookup on the routing table 112. The identified mapping can indicate over which of the communications networks 132 to route the return-link traffic 452.

Various embodiments can include additional considerations that can impact the routing determination. In some such embodiments, the return-link router 440 is coupled with, or includes, the validator 435 (e.g., or there is a separate validator 435 and rulebase 450 for the return-link router 440). As described above, in some implementations, the rulebase 450 defines a validity window for some or all mappings in the routing table 112. In an example return-link routing context, a particular mapping may only be valid for some predetermined about of time since it was last updated, after which it can revert to a prior (e.g., default) mapping. Alternatively, a particular mapping is only valid at certain times of day, when certain networks have presently available capacity, etc. In such cases, the return-link router 440 may make routing determinations based on rules of the rulebase 450, even if the rules conflict with one or more mappings in the routing table 112.

In other such embodiments, the return-link router 440 is coupled with, or includes, the DNS lookup module 437 (e.g., or there is a separate DNS lookup module 437 for the return-link router 440). As described above, associations between the host names and the resolved host IP addresses can be stored for further use. For example, the return-link router 440 can use the stored associations to quickly resolve host names to destination IP addresses in support of routing return-link traffic. In other implementations, the DNS lookup module 437 can be used to perform a reverse DNS lookup, by which to obtain a host name from an IP address. For example, the mappings can include particular mappings (e.g., or rules can be included in the rulebase 450) for routing traffic associated with certain hosts via certain communications networks 132, even where no other corresponding routing table entry is in the routing table 112 (e.g., where the return-link traffic indicates a different destination IP address for a content host than what is mapped in the routing table 112). In such a case, it can be desirable to perform the reverse DNS lookup to determine, for example, whether a corresponding host has previously been mapped in the routing table 112, even if the indicated destination IP address has not.

In some of these and other embodiments, the DNS lookups and/or reverse DNS lookups of the DNS lookup module 437 may take too much time to perform as part of a real-time return-link routing determination. Accordingly, some embodiments of the DNS lookup module 437 can perform DNS lookups and/or reverse DNS lookups as background tasks (e.g., in parallel with the return-link router 440 making routing determinations). For example, when a return-link traffic flow 452 is received by the return-link router 440, the return-link router 440 can proceed with making real-time routing determinations according to mappings available in the routing table 112 and/or according to the rulebase 450 (e.g., default mappings, etc.). Meanwhile, the return-link router 440 can also trigger the DNS lookup module 437 to perform DNS lookups and/or reverse DNS lookups, which may result in an update to, or addition of, one or more mappings. The updated or new mappings can then be used by the return-link router 440 to route subsequent packets of the same return-link traffic flow 452 and/or subsequent flows.

Having made a routing determination, the return-link router 440 can output the return-link traffic flows 452 and the routing determination as the routing state output 442. The hybrid network interface 125 can use the routing state output 442 to route the return-link traffic flows 452 over the hybrid communications network 130. For example, the hybrid network interface 125 can route the return-link traffic flows 452 over a primary one of the component networks 132 (e.g., a satellite network) as a layer 3 routing using the router 470, can route the return-link traffic flows 452 over a layer 2 tunnel via a secondary one of the communications networks 132 using the forwarder 475, etc. In some embodiments, additional functionality is performed by the hybrid network interface 125 as part of routing the return-link traffic flows 452 over the hybrid communications network 130. For example, the NAT 460 can translate the private IP address of the source CPE into a public IP address of the UT 110. Further, implementations can packetize the data, modulate the data, and/or otherwise prepare the return-link traffic flows 452 for communication over the selected communications networks 132.

Figure 5:
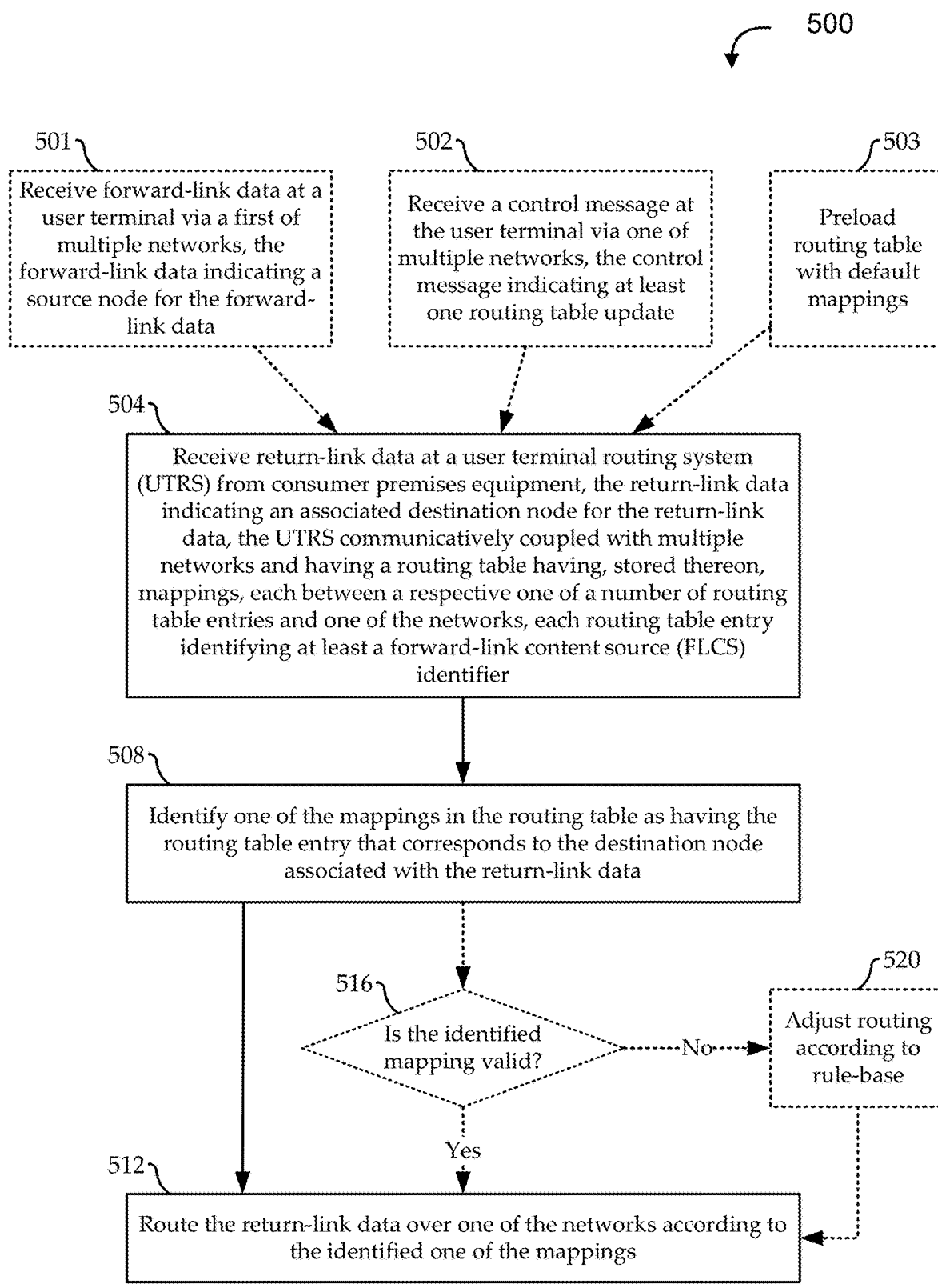
FIG. 5 shows a flow diagram of an illustrative method for return-link routing by a user terminal in a hybrid networking environment, according to various embodiments.

FIG. 5 shows a flow diagram of an illustrative method 500 for return-link routing by a user terminal in a hybrid networking environment, according to various embodiments. Embodiments of the method 500 can be performed using the systems described with reference to FIGS. 1-4, or any other suitable systems. Embodiments of the method 500 begin at stage 504 by receiving return-link data at a user terminal routing system from consumer premises equipment (CPE), the return-link data indicating an associated destination node for the return-link data. As described herein, the user terminal routing system (UTRS) is communicatively coupled with multiple networks and has a routing table populated according to forward-link communications received by the user terminal routing system from at least one of the networks. For example, one of the networks is a satellite network, and the routing table is populated according to forward-link communications received by the UTRS from a provider-side core node (e.g., or gateway) of the satellite network. In various implementations, the core node is communicatively coupled with one, multiple, or all of the networks of the hybrid network. The routing table can be a lookup table, or other suitable data store having, stored thereon, multiple mappings, each between a respective routing table entry and one of the networks. Each routing table entry identifies at least a forward-link content source (FLCS) identifier.

At stage 508, embodiments identify one of the mappings in the routing table as having the routing table entry that corresponds to the destination node associated with the return-link data. For example, the routing table entries can include any suitable FLCS identifier, such as a return-link destination IP address. In some embodiments, each routing table entry includes a five-tuple that identifies a source IP address, a source port, a destination IP address, a destination port, and a data communication protocol. The return-link data can include a return-link routing tuple that indicates the associated destination node for the return-link data. The return-link routing tuple can further indicate a destination Internet protocol (IP) address, and a destination port.

At stage 512, embodiments route the return-link data over one of the networks according to the identified one of the mappings. In some embodiments, the routing at stage 512 is directly in accordance with the stored mappings. For example, forward-link data is received from a particular content host over a particular one of the networks, and return-link data sent to that content host is sent over the same particular one of the networks. In other embodiments, the routing can account for other factors. As illustrated, some embodiments determine at stage 516 whether the mapping identified in stage 508 is valid as is. For example, the routing is directly according to the mapping in stage 512 only if the mapping is determined to be valid at stage 516, and the routing can be adjusted if the mapping is determined not to be valid at stage 516. For example, the routing at stage 512 can be adjusted in stage 520 according to a routing rule-base that defines a set of routing criteria and an alternate network of the plurality of networks, such that, in accordance with whether the set of routing criteria is met, the routing of the return-link data is either over the one of the networks mapped in the routing table to the destination node of the return-link data or over the alternate network.

Similar types of validation, enforcement, adjustment, etc. regarding the routings can be implemented in different ways according to different embodiments. In some embodiments, forward-link data is received at the user terminal via one of the plurality of networks, the forward-link data indicating a source node for the forward-link data. A corresponding one of the mappings of the routing table can be identified as corresponding to the indicated source node, and a determination can be made as to whether the corresponding mapping is presently enforced according to a validity window associated with the identified one of the mappings. In such embodiments, the corresponding mapping may be updated according to the received forward-link data only when the corresponding mapping is not presently enforced. In other such embodiments, forward-link data packets can be received at the user terminal via at least one of the plurality of networks, and each forward-link data packet can indicate a respective source node for the forward-link packet. The method 500 can wait to detect receipt of at least a threshold number of the forward-link data packets that all have a same respective source node and are all received over a first network of the plurality of networks; and only after such detecting, can update the routing table with an updated mapping in response to the detecting. In such embodiments, the updating includes mapping the first network to a routing table entry corresponding to the same respective source node. In yet other such embodiments, the method 500 can determine whether the identified one of the mappings is presently valid according to a validity window associated with the identified one of the mappings, and the routing at stage 512 can be performed according to the identified one of the mappings only when the identified one of the mappings is presently valid. In still other such embodiments, the method 500 can receive forward-link data at the user terminal via a first network of the plurality of networks (the forward-link data indicating a source node for the forward-link data); a corresponding one of the mappings of the routing table can be identified as corresponding to the indicated source node; a determination can be made that the corresponding mapping presently directs routing over a second network of the plurality of networks; and the corresponding mapping can be updated to direct routing over the first network only when the second network is a primary network of the plurality of networks, and the first network is not the primary network of the plurality of networks.

Some embodiments of the method 500 begin by populating and/or updating some or all of the routing table mappings prior to the receiving at stage 504. For example, at stage 501, embodiments can receive forward-link data at the user terminal via a first of the networks prior to receiving the return-link data at stage 504. The forward-link data can indicate a source node for the forward-link data, and the routing table can be updated with an updated mapping according to the received forward-link data. In such embodiments, the identifying at stage 508 can include determining that the destination node for the return-link data corresponds to the source node for the forward-link data, such that the identified one of the mappings is the updated mapping; and the routing at stage 512 can include routing the return-link data over the first network according to the updated mapping. In some such embodiments, the updating at stage 501 includes mapping the first network to a routing table entry for the source node, and the routing at stage 512 includes routing the return-link data over the first network according to the updated mapping. Other embodiments of the method 500 can begin at stage 502 by receiving a control message at the user terminal via one of the networks (e.g., the control message indicates at least one routing table update) and updating the routing table according to the at least one routing table update. Still other embodiments of the method 500 begin at stage 503 by pre-populating some or all of the routing table, for example, with default mappings. For example, each of at least a portion of the preloaded mappings can be preloaded by: selecting one of a multiple pre-stored associations between a corresponding content host and a corresponding one of the plurality of networks; performing a domain name server (DNS) lookup to determine a destination IP address associated with the corresponding content host; and generating the preloaded mapping to associate the corresponding one of the plurality of networks with a routing table entry comprising the destination IP address. Similarly, in some embodiments, at least one of the routing table entries can indicate a return-link destination IP address, and at least one of the mappings can be generated by: determining a content host corresponding to the return-link destination IP address indicated by the at least one routing table entry; identifying a pre-stored association between the content host and a routing network of the plurality of networks; and generating the at least one mapping to associate the routing table entry with the identified routing network. For example, the content host can be determined by performing a reverse DNS lookup (e.g., by the UTRS as a background task concurrently with the identifying at stage 508 and/or the routing at stage 512).

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for routing signals in a hybrid network, the method comprising:
communicatively coupling a user terminal routing system with a plurality of networks having different network characteristics;
maintaining a routing table populated with a plurality of mappings, each mapping associating a destination node associated with return-link data and one of the plurality of networks with which the user terminal routing system is communicatively coupled, wherein the plurality of mappings define a routing of return-link data to one of the plurality of networks based on an associated destination node for the return-link data, and wherein at least one of the plurality of mappings indicates a return-link destination Internet-protocol (IP) address;
receiving a control message including at least one routing table update;
updating the routing table with an updated mapping based on the at least one routing table update; and
generating at least one of the plurality of mappings by:
determining, by the user terminal routing system, a content host corresponding to the return-link destination IP address;

identifying a pre-stored association between the content host and a routing network of the plurality of networks; and generating the at least one mapping to associate the return-link destination IP with the identified routing network.

2. The method of claim 1, wherein the control message is received at the user terminal routing system from one of the plurality of networks.

3. The method of claim 1, further comprising:

receiving the return-link data at the user terminal routing system from consumer premises equipment, the return-link data indicating the associated destination node for the return-link data;

identifying one of the mappings in the routing table as corresponding to the destination node associated with the return-link data; and routing the return-link data over the one of the plurality of networks according to the identified one of the mappings.

4. The method of claim 3, wherein:

routing the return-link data according to the identified one of the mappings comprises routing according to a routing rule-base that defines a set of routing criteria and an alternate network of the plurality of networks, such that, in accordance with whether the set of routing criteria is met, the routing of the return-link data is either over the one of the plurality of networks mapped in the routing table to the destination node of the return-link data or over the alternate network.

5. The method of claim 3, further comprising:

determining, by the user terminal routing system, whether the identified one of the mappings is presently valid according to a validity window associated with the identified one of the mappings; and routing the return-link data according to the identified one of the mappings only when the identified one of the mappings is presently valid.

6. The method of claim 1, wherein each mapping comprises a routing table entry comprising a five-tuple that identifies a source Internet protocol (IP) address, a source port, a destination IP address, a destination port, and a data communication protocol.

7. The method of claim 1, wherein:

the return-link data comprises a return-link routing tuple that indicates the associated destination node for the return-link data.

8. The method of claim 7, wherein the return-link routing tuple further indicates the return-link destination Internet-protocol (IP) address, and a destination port.

9. The method of claim 1, wherein:

one of the plurality of networks is a satellite network; and the routing table is populated according to forward-link communications received by the user terminal routing system from a provider-side core node of the satellite network.

10. The method of claim 9, wherein the core node is communicatively coupled with multiple of the plurality of networks.

11. A method for routing signals in a hybrid network, the method comprising:

communicatively coupling a user terminal routing system with a plurality of networks having different network characteristics;

maintaining a routing table populated with a plurality of mappings, each mapping associating a destination node associated with return-link data and one of the plurality of networks with which the user terminal routing system is communicatively coupled, wherein the plurality of mappings define a routing of return-link data to one of the plurality of networks based on an associated destination node for the return-link data;

receiving a control message including at least one routing table update;

updating the routing table with an updated mapping based on the at least one routing table update;

receiving forward-link data at the user terminal via a first network of the plurality of networks, the forward-link data indicating a source node for the forward-link data;

identifying a corresponding one of the mappings of the routing table as corresponding to the indicated source node;

determining, by the user terminal routing system, that the corresponding mapping presently directs routing over a second network of the plurality of networks; and updating the corresponding mapping to direct routing over the first network only when the second network is a primary network of the plurality of networks, and the first network is not the primary network of the plurality of networks.

12. A method for routing signals in a hybrid network, the method comprising:

communicatively coupling a user terminal routing system with a plurality of networks having different network characteristics;

maintaining a routing table populated with a plurality of mappings, each mapping associating a destination node associated with return-link data and one of the plurality of networks with which the user terminal routing system is communicatively coupled, wherein the plurality of mappings define a routing of return-link data to one of the plurality of networks based on an associated destination node for the return-link data;

receiving a control message including at least one routing table update;

updating the routing table with an updated mapping based on the at least one routing table update;

receiving forward-link data at the user terminal via one of the plurality of networks, the forward-link data indicating a source node for the forward-link data;

identifying a corresponding one of the mappings of the routing table as corresponding to the indicated source node;

determining, by the user terminal routing system, whether the corresponding mapping is presently enforced according to a validity window associated with the identified one of the mappings; and updating the corresponding mapping according to the received forward-link data only when the corresponding mapping is not presently enforced.

13. The method of claim 1, wherein the determining comprises performing a reverse domain name server (DNS) lookup.

14. The method of claim 13, wherein the reverse DNS lookup is performed by the user terminal routing system as a background task concurrently with the identifying and the routing.

15. The method of claim 1, wherein the routing table is a preloaded table with a plurality of preloaded mappings prior to the receiving.

16. The method of claim 15, wherein each of at least a portion of the preloaded mappings is preloaded by:

selecting one of a plurality of pre-stored associations between a corresponding content host and a corresponding one of the plurality of networks;

performing a domain name server (DNS) lookup to determine a destination Internet protocol (IP) address associated with the corresponding content host; and generating the preloaded mapping to associate the corresponding one of the plurality of networks with a routing table entry comprising the destination IP address.

17. A user terminal routing system comprising:

a local network interface operable to couple with a local user network;

a hybrid network interface comprising a plurality of network interfaces, each operable to couple with a respective one of a plurality of communications networks of a hybrid network having different network characteristics;

a routing table having stored thereon populated with a plurality of mappings that each associate a destination node associated with return-link data with one of the plurality of communications networks, and wherein at least one of the plurality of mappings indicates a return-link destination Internet-protocol (IP) address;

a mapping generator operative to generate at least one of the plurality of mappings by:

determining, by the user terminal routing system, a content host corresponding to the return-link destination IP address, identifying a pre-stored association between the content host and a routing network of the plurality of networks, and generating the at least one mapping to associate the return-link destination IP with the identified routing network; and a routing table updater coupled between the hybrid network interface and the routing table to:

receive a control message including at least one routing table update; and update the routing table with an updated mapping based on the at least one routing table update.

18. The user terminal routing system of claim 17, wherein the control message is received at the user terminal routing system from one of the plurality of networks.

19. The user terminal routing system of claim 17, further comprising:

a routing state machine coupled between the local network interface and the hybrid network interface, the routing state machine comprising a routing state output computed according to the routing table in response to receiving return-link data via the local network interface, such that:

the received return-link data indicates a destination node corresponding to an identified one of the mappings, and the routing state output directs routing of the received return-link data over a selected one of the plurality of communications networks via the hybrid network interface in accordance with the identified one of the mappings.

20. The user terminal routing system of claim 19, wherein each destination node comprises an Internet protocol address.

21. The user terminal routing system of claim 19, wherein:

the routing state machine comprises a stored routing rule-base that defines a set of routing criteria and an alternate network of the plurality of networks, such that, in accordance with whether the set of routing criteria is met, the routing state output directs routing of the return-link data either over the one of the plurality of networks mapped in the routing table to the destination node of the return-link data or over the alternate network.

22. The user terminal routing system of claim 21, wherein:

the stored rule-base defines respective validity windows for at least some of the mappings; and the routing state output directs routing of the return-link data further according to the respective validity windows.

23. The user terminal routing system of claim 19, wherein:

the return-link data comprises a return-link routing tuple that indicates the associated destination node for the return-link data.

24. The user terminal routing system of claim 17, wherein the routing table comprises a plurality of preloaded default mappings.

25. The user terminal routing system of claim 17, wherein the local user network comprises at least one customer premises equipment (CPE) device.

26. The user terminal routing system of claim 17, wherein each mapping comprises a routing table entry comprising a five-tuple that identifies a source Internet protocol (IP) address, a source port, a destination IP address, a destination port, and a data communication protocol.

27. The user terminal routing system of claim 17, wherein the return-link data comprises a return-link routing tuple that further indicates the return-link destination Internet-protocol (IP) address, and a destination port.

28. The user terminal routing system of claim 17, wherein:

one of the plurality of networks is a satellite network; and the routing table is populated according to forward-link communications received by the user terminal routing system from a provider-side core node of the satellite network.

29. The user terminal routing system of claim 28, wherein the core node is communicatively coupled with multiple of the plurality of networks.

* * * * *